United States Patent
Kreiner et al.

(10) Patent No.: US 9,767,336 B2
(45) Date of Patent: *Sep. 19, 2017

(54) METHODS, COMPUTER PROGRAM PRODUCTS, AND SYSTEMS FOR PROVIDING AUTOMATED VIDEO TRACKING VIA RADIO FREQUENCY IDENTIFICATION

(71) Applicant: AT&T Intellectual Property I, L.P., Atlanta, GA (US)

(72) Inventors: Barrett Kreiner, Woodstock, GA (US); Jonathan L. Reeves, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/283,945

(22) Filed: Oct. 3, 2016

(65) Prior Publication Data

US 2017/0024588 A1     Jan. 26, 2017

Related U.S. Application Data

(63) Continuation of application No. 14/961,546, filed on Dec. 7, 2015, now Pat. No. 9,460,754, which is a continuation of application No. 14/468,310, filed on Aug. 25, 2014, now Pat. No. 9,210,365, which is a continuation of application No. 12/255,269, filed on Oct. 21, 2008, now Pat. No. 8,816,855.

(51) Int. Cl.
*H04N 5/76*     (2006.01)
*G01S 13/82*    (2006.01)
*G06K 17/00*    (2006.01)
*G11B 27/02*    (2006.01)
*G11B 27/10*    (2006.01)
*G06K 7/10*     (2006.01)
*G01S 13/86*    (2006.01)

(52) U.S. Cl.
CPC ............ *G06K 7/1097* (2013.01); *G01S 13/82* (2013.01); *G01S 13/867* (2013.01); *G06K 7/10079* (2013.01); *G06K 7/10366* (2013.01); *G06K 17/00* (2013.01); *G11B 27/02* (2013.01); *G11B 27/10* (2013.01); *H04N 5/76* (2013.01); *G06K 2017/0045* (2013.01); *H04Q 2213/13095* (2013.01)

(58) Field of Classification Search
CPC ....................................................... G11B 27/10
See application file for complete search history.

(56) References Cited

U.S. PATENT DOCUMENTS

| | | | |
|---|---|---|---|
| 5,793,630 A | | 8/1998 | Theimer et al. |
| 5,912,980 A | * | 6/1999 | Hunke ............... G06K 9/00228 348/169 |
| 7,123,126 B2 | * | 10/2006 | Tanaka .................. G06K 17/00 340/5.2 |

(Continued)

*Primary Examiner* — Joseph Feild
*Assistant Examiner* — Pameshanand Mahase

(57) ABSTRACT

Methods, computer program products and systems for providing video tracking. The method includes receiving a first signal from a radio frequency identification (RFID) tag. A location of the RFID tag is determined in response to the first signal. An image that includes the location of the RFID tag is recorded. The location of the RFID tag is marked on the image, resulting in a marked image.

20 Claims, 4 Drawing Sheets

(56) References Cited

U.S. PATENT DOCUMENTS

| | | | |
|---|---|---|---|
| 7,239,241 B2* | 7/2007 | Claudatos | G06Q 10/087 340/10.1 |
| 9,210,365 B2 | 12/2015 | Kreiner | |
| 9,460,754 B2* | 10/2016 | Kreiner | G01S 13/82 |
| 2002/0145524 A1* | 10/2002 | Shepher | G08B 13/19 340/573.1 |
| 2002/0163577 A1* | 11/2002 | Myers | G08B 13/19643 348/152 |
| 2005/0206500 A1 | 9/2005 | Ferren et al. | |
| 2007/0002159 A1 | 1/2007 | Olsen et al. | |
| 2008/0214261 A1 | 9/2008 | Alderucci | |

\* cited by examiner

METHODS, COMPUTER PROGRAM PRODUCTS, AND SYSTEMS FOR PROVIDING AUTOMATED VIDEO TRACKING VIA RADIO FREQUENCY IDENTIFICATION

This application is a continuation of U.S. patent application Ser. No. 14/961,546, filed Dec. 7, 2015, now U.S. Pat. No. 9,460,754, which is a continuation of U.S. patent application Ser. No. 14/468,310, filed Aug. 25, 2014, now U.S. Pat. No. 9,210,365, which is a continuation of U.S. patent application Ser. No. 12/255,269, filed Oct. 21, 2008, now U.S. Pat. No. 8,816,855, all of the above cited applications are herein incorporated by reference in their entirety.

BACKGROUND

Exemplary embodiments relate generally to video tracking, and more particularly to providing automated video tracking via radio-frequency identification (RFID).

RFID is a technology that allows for the automatic identification and tracking of items. A typical RFID configuration includes RFID tags attached to objects, and one or more RFID readers for reading signals sent by the RFID tags. The signals may include a unique identifier for the object and/or additional data about the object such as size, shape, type, weight, etc. In the case where the RFID tags are passive, the configuration also includes at least one RFID emitter to generate RFID signal to be sent to the RFID tags. The RFID signals are received by antennas on the RFID tags and include enough power to cause an integrated circuit in the RFID tag to power up and transmit a response signal. This response signal is read by one or more RFID readers. One RFID reader can be utilized to determine a two-dimensional location of the RFID tag, while two or more RFID readers can be utilized to determine a three-dimensional location of the RFID tag. Typical applications of the RFID technology include inventory tracking, inventory management, and supply chain management.

Standard cameras (digital, film) are utilized to capture images that include light in the visible spectrum, while full spectrum cameras are utilized to capture images that include light that is not in the visible spectrum. A typical full spectrum camera captures infrared, ultraviolet and visible light. One application of full spectrum photography is in forensics to emphasize non-visible materials (e.g., gun shot residue, fibers, etc.) that show up better in the ultraviolet and/or infrared spectrums. Both types of cameras may be used for security purposes by having a field of view focused on an area to be protected (with the camera stationary or scanning).

BRIEF SUMMARY

Exemplary embodiments include a method for providing video tracking. The method includes receiving a first signal from a radio frequency identification (RFID) tag. A location of the RFID tag is determined in response to the first signal. An image that includes the location of the RFID tag is recorded. The location of the RFID tag is marked on the image, resulting in a marked image.

Additional exemplary embodiments include a system for providing video tracking. The system includes one or more RFID readers receiving one or more signals from a RFID tag and determining a location of the RFID tag in response to the signals. The system also includes an image recorder connected to the one or more RFID readers, the image recorder recording an image that includes the location of the RFID tag. The system further includes an image marker connected to the image recorder, the image marker marking the location of the RFID tag on the image, resulting in a marked image.

Further, exemplary embodiments include a computer program product, tangibly embodied on a computer readable medium, for providing video tracking. The computer program product has instructions for causing a computer to execute a method, which includes receiving a first signal from a RFID tag. A location of the RFID tag is determined in response to the first signal. An image that includes the location of the RFID tag is recorded. The location of the RFID tag is marked on the image, resulting in a marked image.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGs..

The detailed description explains the exemplary embodiments, together with advantages and features, by way of example with reference to the drawings.

DETAILED DESCRIPTION OF EXEMPLARY EMBODIMENTS

Exemplary embodiments provide video tracking, including the ability for a camera to automatically locate and record images of objects of interest. A radio frequency identification (RFID) tag is attached to objects of interest. A RFID reader connected to the camera (or integrated into the camera) is utilized to receive RFID signals from the RFID tag. The RFID signals may provide an identifier for the object of interest as well information about the object (e.g., type, size, value). If the RFID tag is in the field of view of the camera, then a picture is taken that includes the RFID tag. If the RFID tag is not in the field of view of the camera, then the camera is positioned (e.g., automatically) so that the field of view includes the RFID tag and then a picture is taken. The resulting image includes a marker (e.g., an "x") that identifies the location of the RFID tag in the picture. In other embodiments, the resulting image includes an overlay of an image of the object on the picture. In this manner, objects of interest may be located and tracked.

As used herein, the term "image recorder" refers to any device for taking a single picture or a video, including, but not limited to a standard camera, a full spectrum camera, and a video recorder.

Figure 1:
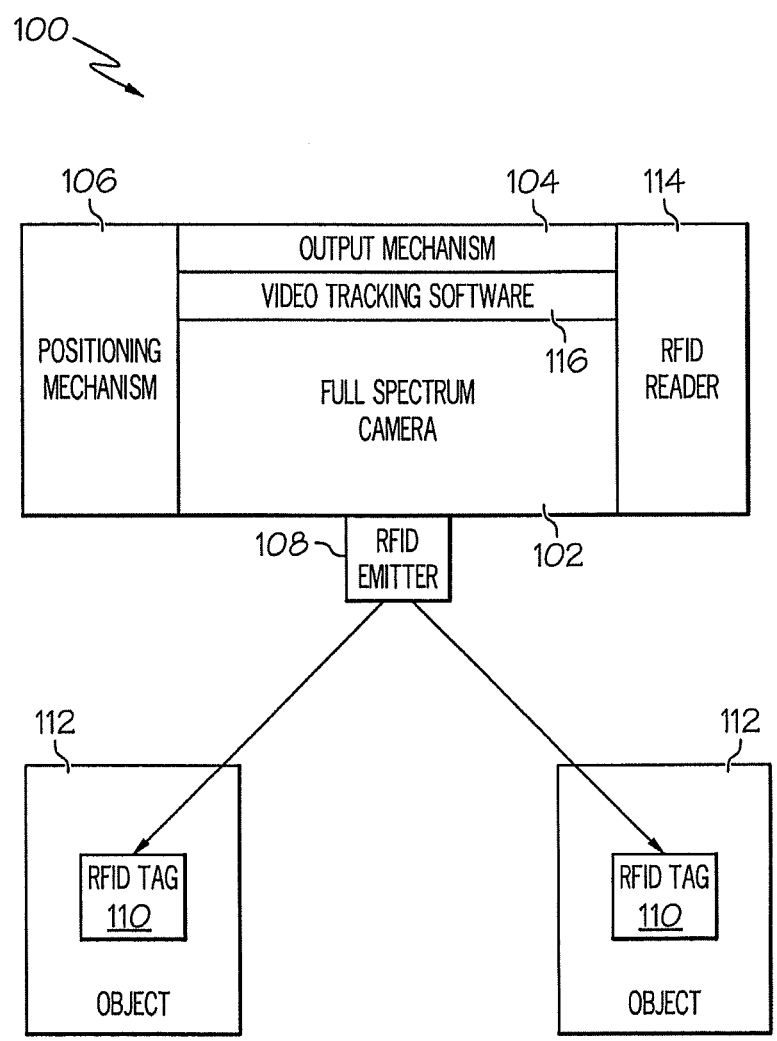
FIG. 1 illustrates a block diagram of a system for providing video tracking using a full spectrum camera that may be implemented by exemplary embodiments.

FIG. 1 illustrates a block diagram of a system 100 for providing video tracking using a full spectrum camera 102 that may be implemented by exemplary embodiments. According to exemplary embodiments, the system 100 includes the full spectrum camera 102, video tracking software 116, an output mechanism 104, a positioning mechanism 106, an RFID reader 114, an RFID emitter 108, and two objects 112 each having an RFID tag 110. The full spectrum camera 102 is utilized for recording an image (single picture or video) that includes the visible spectrum as well as portions of the infrared spectrum and the ultraviolet spectrum. The full spectrum camera 102 is an example of an image recorder.

In exemplary embodiments, the video tracking software 116, connected to or integrated with the full spectrum camera 102, directs the video tracking processing performed by the system 100.

In the example system 100 depicted in FIG. 1, the RFID tags 110 are passive tags and the RFID emitter 108 is utilized to communicate with the RFID tags 110 that are within range of the RFID emitter 108. In response to receiving the communication from the RFID emitter 108, the RFID tags 110 power on and broadcast signals that are received by the RFID reader 114. The video tracking software 116 determines the locations of the RFID tags 110 and determines if they are in the current field of view of the full spectrum camera 102. If they are in the current field of view, then the full spectrum camera 102 takes a picture that includes the location of the RFID tags 110. In exemplary embodiments, if the RFID tags 110 are not in the current field of view of the full spectrum camera 102, then the video tracking software 116 directs the positioning mechanism 106 to move the field of view of the full spectrum camera 102 to include the RFID tags. In exemplary embodiments, if it is not possible for both of the RFID tags 110 to be included in the same image, then the video tracking software 116 directs the full spectrum camera 102 to record two images, each including one of the RFID tags 110.

In exemplary embodiments, such as that depicted in FIG. 1, the signals from the RFID tags 110 are in the infrared or ultraviolet spectrum and therefore, visible to the full spectrum camera 102. Thus, the image recorded by the full spectrum camera 102 includes a marking that corresponds to the RFID tags 110 and their corresponding objects. In these embodiments, the image marker is integrated into the full spectrum camera 102. In alternate exemplary embodiments, the positions of the RFID tags 110 may be further enhanced on the image to show data about the objects (e.g., data included in the response signals from the RFID tags).

In exemplary embodiments, the marked image is output via the output mechanism 104. Outputting includes, but is not limited to: storing the marked image on a storage device local to the full spectrum camera 102, storing the marked image on a storage device accessible via a network, printing the marked image, and transmitting the marked image to a requestor.

In exemplary embodiments, all or a subset of the full spectrum camera 102, video tracking software 116, output mechanism 104, positioning mechanism 106, RFID reader 114, and RFID emitter 108, are integrated with each other as a single physical component. In other exemplary embodiments, the full spectrum camera 102, video tracking software 116, output mechanism 104, positioning mechanism 106, RFID reader 114, and RFID emitter 108 are stand alone components that are connected to each other.

The configuration depicted in FIG. 1 is exemplary in nature and other configurations may be implemented by exemplary embodiments that utilize the full spectrum camera 102. For example, the system 100 may include two RFID readers 114 in order to determine three-dimensional locations of the objects 112. The three dimensional locations may then be utilized to set focusing controls (e.g., zooming) on the full spectrum camera 102 before recording the image. In other embodiments, the full spectrum camera 102 is not connected to a positioning mechanism, such as the positioning mechanism 106, and the RFID tags 110 currently in the field of view of the full spectrum camera 102 are the only RFID tags that are included in the recorded image.

Figure 2:
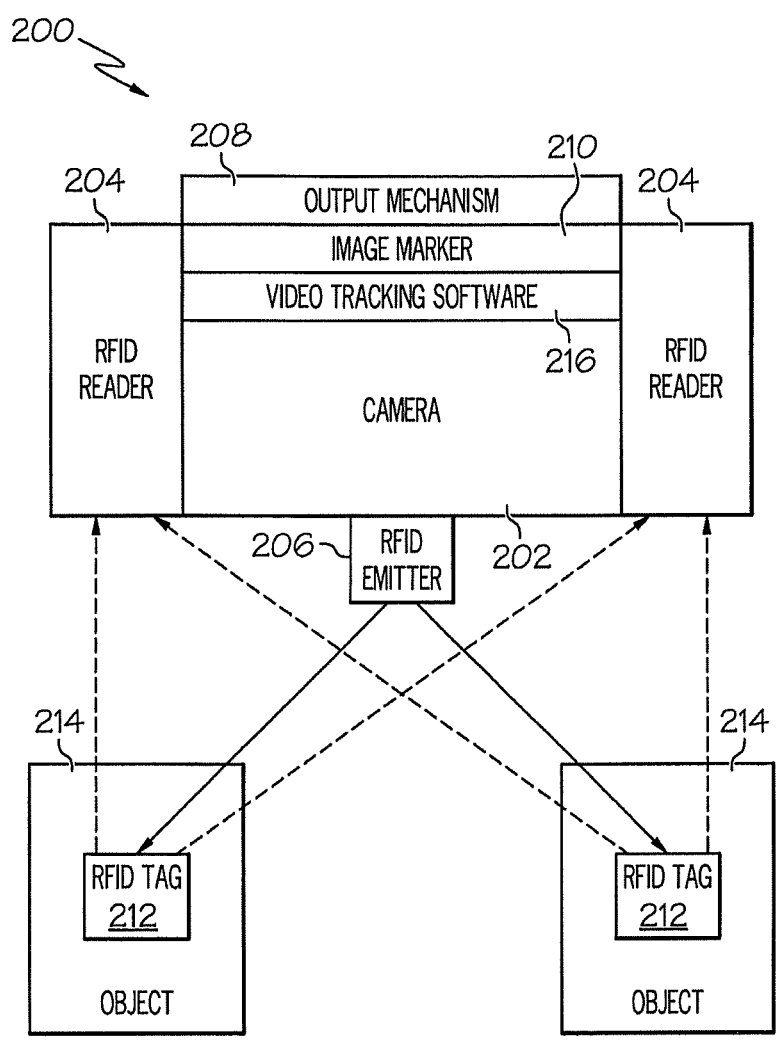
FIG. 2 illustrates a block diagram of a system for providing video tracking using a standard camera that may be implemented by exemplary embodiments.

FIG. 2 illustrates a block diagram of a system 200 for providing video tracking using a standard camera that may be implemented by exemplary embodiments. According to exemplary embodiments, the system 200 includes a camera 202, video tracking software 216, an image marker 210, an output mechanism 208, two RFID readers 204, an RFID emitter 206, and two objects 214 each having an RFID tag 212. The camera 202 is utilized for recording an image that includes the visible spectrum and is an example of an image recorder.

In exemplary embodiments, the video tracking software 216, connected to or integrated with the camera 202, directs the video tracking processing performed by the system 200.

In the example system 200 depicted in FIG. 2, the RFID tags 212 are passive tags and the RFID emitter 206 is utilized to communicate with the RFID tags 212 that are within range of the RFID emitter 206. In response to receiving the communication from the RFID emitter 206, the RFID tags 212 power on and broadcast signals that are received by the RFID readers 204. The video tracking software 216 determines the locations of the RFID tags 212 and determines if they are in the current field of view of the camera 202. Because there are two RFID readers 204, three-dimensional positions of the RFID tags 212 can be determined. This information may be utilized to set focus parameters on the camera 202 (e.g., zoom, crop). If one or both of the RFID tags 212 are in the current field of view, then the camera 202 records an image (e.g., takes a picture).

In exemplary embodiments, such as that depicted in FIG. 2, the signals from the RFID tags 212 are not visible in the image even if one or both of the RFID tags 212 are located on objects captured by the image. The video tracking software 216 directs the image marker 210 to mark any RFID tag locations on the image based on the locations of the RFID markers (determined in response to the RFID signals) and the field of view of the camera 202 when it recorded the image. The marking could be as simple as an "x" on the image wherever there is an RFID tag 212, the marking could also include data about the object 214 associated with the RFID tag 212, or the marking could further include an overlay of the object on the image. An overlay of the object on the image is useful for tracking objects that can easily fit in to locations such as pockets or briefcases. The resulting image with the marking is referred to herein as a "marked image".

In exemplary embodiments, the marked image is output via the output mechanism 208. Outputting includes, but is not limited to: storing the marked image on a storage device local to the camera 202, storing the marked image on a storage device accessible via a network, printing the marked image, and transmitting the marked image to a requestor.

In exemplary embodiments, all or a subset of the camera 202, video tracking software 216, image marker 210, output mechanism 208, RFID readers 204, and RFID emitter 206 are integrated with each other as a single physical component. In other exemplary embodiments, the camera 202, video tracking software 216, image marker 210, output mechanism 208, RFID readers 204, and RFID emitter 206 are stand alone components that are connected to each other.

The configuration depicted in FIG. 2 is exemplary in nature as other configurations may be implemented by exemplary embodiments that utilize a standard camera 202. For example, the system 200 may include one RFID reader 204 to determine two-dimensional locations of the objects 214. In other embodiments, the camera 202 is connected to a positioning mechanism, such as the one depicted in FIG. 1, in order to position the camera 202 before capturing the image.

In exemplary embodiments, not every object 214 with an RFID tag, such as the RFID tag 212, is an object of interest and thus, the video tracking software 216 screens out objects that are not of interest. In this manner, the video tracking software 216 may focus on particular objects (e.g., expensive objects, difficult to replace objects, objects easily stolen). The identifiers and/or groups associated with particular objects of interest may be specified by an administrator of the video tracking system. In addition, particular objects or types of objects may be marked as items that are not to be tracked.

Figure 3:
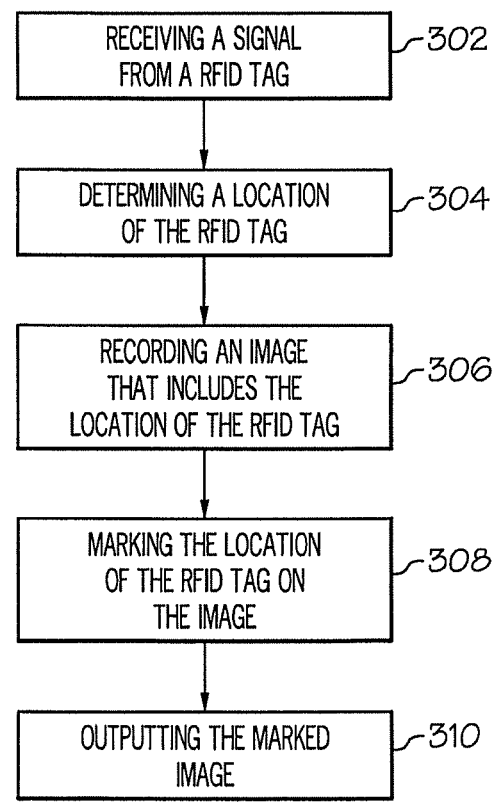
FIG. 3 illustrates a process flow for providing video tracking that may be implemented by exemplary embodiments.

FIG. 3 illustrates a process flow for providing video tracking that may be implemented by exemplary embodiments. In exemplary embodiments, the process flow depicted in FIG. 3 is facilitated by video tracking software (e.g., the video tracking software 116, the video tracking software 216). At block 302 in FIG. 3, a signal from a RFID tag (e.g. the RFID tag 110, the RFID tag 212) is received at a RFID reader, such as the RFID reader 204 or the RFID reader 114. The RFID tag is attached to an object and the signal includes data to identify an object (e.g., the object 214, the object 112), and may include data describing the object. At block 304, a location of the RFID tag is determined. As described previously, the location may be a two dimensional location or a three dimensional location depending on the number of RFID readers that are included in the system.

At block 306 in FIG. 3, an image that includes the location of the RFID tag is recorded by an image recorder (e.g., a standard video camera, the standard camera 202, the full spectrum camera 102). As described previously, in exemplary embodiments, the camera is repositioned if required (e.g., via the positioning mechanism 106) so that the field of view of the camera includes the RFID tag. At block 308, the location of the RFID tag is marked on the image, resulting in a marked image. As described previously, the marking may be performed by a separate component (e.g., image marker 210) and/or the marking may be performed automatically by the full spectrum camera 102. At block 310, the marked image is output (e.g., to a user, to a storage device, to another computer program) via an output mechanism (e.g., the output mechanism 104, the output mechanism 210.

Exemplary embodiments may be utilized to provide security, for example, in a computer lab. The computer lab may contain expensive equipment that is small in size. The objects of interest (e.g., expensive equipment) are tagged with RFID tags. RFID readers would read signals from the RFID tags and adjust the security camera (continuously, periodically, in response to the object moving, in response to the object moving towards the exit) so that the object of interest is in the field of view of the camera and so that the camera is focused on the object. An image is then recorded and marked with the location of the object. In this manner, the object is tracked. If the object is not in clear view (e.g., in a person's pocket), the object's location is still marked on the image so that the location of the object may be tracked. This same type of set-up may be implemented by a retail store to track items being sold.

Other exemplary embodiments may be implemented to assist in finding and/or tracking objects. In these embodiments, a user enters object criteria (e.g., size, type, identifier) and request the video tracking system to find the object(s). The video tracking system checks any signals received from the RFID tags in its location and alerts the user if objects that meet the criteria are found. In exemplary embodiments the user enters the object criteria and receives the alerts via a user device.

Figure 4:
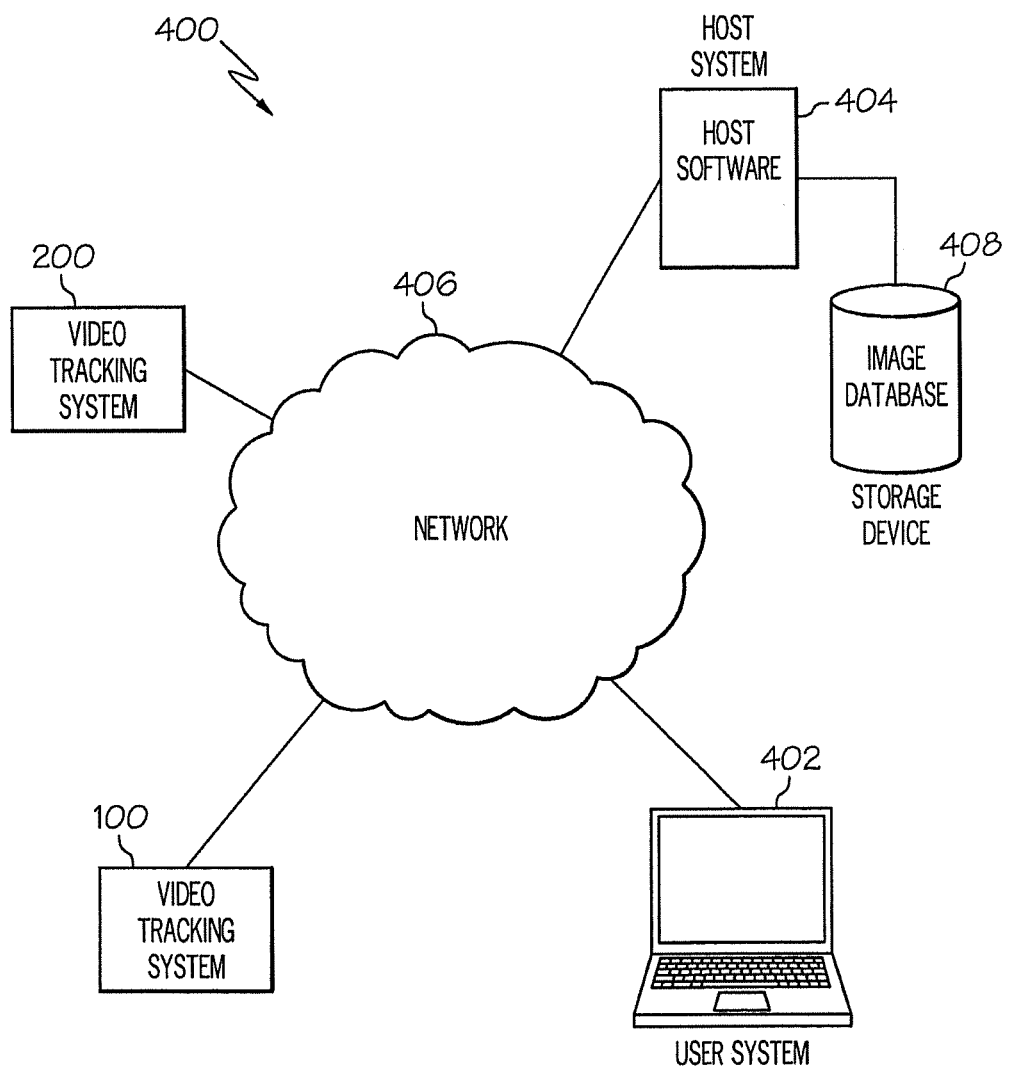
FIG. 4 illustrates a block diagram of a system for providing video tracking in a network environment that may be implemented by exemplary embodiments.

This concept of finding and/or tracking objects can be expanded to include several locations. FIG. 4 illustrates a block diagram of a system 400 for providing video tracking in a network environment that may be implemented by exemplary embodiments. The system 400 includes one or more user systems 402 through which users at one or more geographic locations may contact a host system 404 to request that particular objects having RFID tags become objects of interest at one or more video tracking system locations. In addition, the users may request access to an image database to view images taken at the video tracking system locations. The user systems 402 are coupled to the host system 404 via a network 406. Each user system 402 may be implemented using a general-purpose computer executing a computer program for carrying out the processes described herein. The user systems 402 may be personal computers (e.g., a lap top, a personal digital assistant) or host attached terminals. If the user systems 402 are personal computers, the processing described herein may be shared by the user system 402 and the host system 404 (e.g., by providing an applet to the user system 402) or contained completely on the user system 402.

The system 400 also includes one or more video tracking systems 100, 200 that are connected to the host system 404 via the network 406. The network 406 may be any type of known network including, but not limited to, a wide area network (WAN), a local area network (LAN), a global network (e.g. Internet), a virtual private network (VPN), and an intranet. The network 406 may be implemented using a wireless network or any kind of physical network implementation known in the art. The user system 402 may be coupled to the host system 404 through multiple networks (e.g., intranet and Internet) so that not all of the user systems 402 are coupled to the host system 404 through the same network. One or more of the user systems 402 and the host system 404 may be connected to the network 406 in a wireless fashion.

A storage device 408 may be implemented using a variety of devices for storing electronic information. It is understood that the storage device 408 may be implemented using memory contained in the host system 404 or the user system 402 or the storage device may be a separate physical device. The storage device 408 is logically addressable as a consolidated data source across a distributed environment that includes the network 406. Information stored in the storage device 408 may be retrieved and manipulated via the host system 404. The storage device 408 includes application data such as an image database containing all or a subset of the images recorded by the video tracking systems 100, 200. The storage device 408 may also include other kinds of data such as information concerning the updating and creation of the image database. In exemplary embodiments, the host system 404 operates as a database server and coordinates access to application data including data stored on the storage device 408.

The host system 404 depicted in FIG. 4 may be implemented using one or more servers operating in response to a computer program stored in a storage medium accessible by the server. The host system 404 may operate as a network server (e.g., a web server) to communicate with the user system 402. The host system 404 handles sending and receiving information to and from the user system 402 and can perform associated tasks. The host system 404 may also include a firewall to prevent unauthorized access to the host system 404 and enforce any limitations on authorized access. For instance, an administrator may have access to the entire system and have authority to modify portions of the system. A firewall may be implemented using conventional hardware and/or software as is known in the art.

The host system 404 may also operate as an application server. The host system 404 executes one or more computer programs (e.g., the host software) to provide a user interface to direct the video tracking systems 100, 200 and to access images recorded by the video tracking systems 100, 200. Processing may be shared by the user system 402 and the host system 404 by providing an application (e.g., java applet) to the user system 402. Alternatively, the user system 402 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

In exemplary embodiments, groups of RFID tagged objects make up constellations. A constellation of RFID tagged objects may indicate a larger object such as, but not limited to a car, a human, a home, an office, and a store. A known or guessed constellation is of interest to the video tracking system and the camera automatically tracks the constellation as an object for auto focusing. If there are multiple constellations known or guessed to be people or things in the picture, the camera may automatically zoom, crop, and focus to those groups and provide a better picture. Constellations may be utilized to provide automatic picture content tagging.

As described above, exemplary embodiments can be in the form of computer-implemented processes and apparatuses for practicing those processes. Exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the present disclosure has been described with reference to exemplary embodiments, it will be understood by those skilled in the art that various changes may be made and equivalents may be substituted for elements thereof without departing from the scope. In addition, many modifications may be made to adapt a particular situation or material to the teachings of the present disclosure without departing from the essential scope thereof. Therefore, it is intended that the present disclosure not be limited to the particular exemplary embodiments disclosed for carrying out this invention, but that the present disclosure will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing a marked image, the method comprising:
   recording, by an image recorder, an image that includes a location of a radio frequency identification tag; and
   marking, by the image recorder, the location of the radio frequency identification tag on the image, resulting in the marked image, wherein the marking is performed by overlaying the location of the radio frequency identification tag identified on the image, wherein the image recorder recognizes a first signal emitted from the radio frequency identification tag, wherein the first signal comprises an ultraviolet signal and the marking is performed by the image recorder based on the first signal, wherein the radio frequency identification tag is attached to an object and the first signal includes data about the object, the data comprising a type of the object, wherein the first signal is emitted by the radio frequency identification tag when the radio frequency identification tag receives a radio frequency signal from a radio frequency identification emitter.

2. The method of claim 1, wherein the data about the object further comprises a size of the object.

3. The method of claim 2, wherein the marking further includes overlaying an image of the object on the image at the location, wherein the overlaying at the location of the radio frequency identification tag is responsive to the data about the object.

4. The method of claim 1, further comprising:
   determining prior to the recording if a field of view of the image recorder includes the location of the radio frequency identification tag; and
   positioning the image recorder so that the field of view of the image recorder includes the location of the radio frequency identification tag in response to determining that the field of view of the image recorder does not include the location of the radio frequency identification tag.

5. The method of claim 1, comprising:
   focusing the image recorder on the object.

6. The method of claim 1, further comprising:
   receiving an additional signal from an additional radio frequency identification tag, the radio frequency identification tag and the additional radio frequency identification tag making up a constellation; and
   determining a location of the additional radio frequency identification tag, wherein the image that is recorded further includes the location of the additional radio frequency identification tag.

7. The method of claim 6, further comprising:
determining prior to the recording if a field of view of the image recorder includes the location of the radio frequency identification tag and the additional radio frequency identification tag; and
positioning the image recorder so that the field of view of the image recorder includes the location of the radio frequency identification tag and the additional radio frequency identification tag in response to determining that the field of view of the image recorder does not include the location of the radio frequency identification tag and the additional radio frequency identification tag.

8. The method of claim 1, wherein the image recorder is a video camera.

9. A system for providing a marked image, the system comprising:
an image recorder for recording an image that includes a location of a radio frequency identification tag and for marking the location of the radio frequency identification tag on the image, resulting in the marked image, wherein the marking is performed by overlaying the location of the radio frequency identification tag identified on the image, wherein the marking is performed in response to receiving a signal from the radio frequency identification tag, wherein the signal is an ultraviolet signal, wherein the radio frequency identification tag is attached to an object and the signal includes data about the object, the data comprising a type of the object, wherein the signal is emitted by the radio frequency identification tag when the radio frequency identification tag receives a radio frequency signal from a radio frequency identification emitter.

10. The system of claim 9, wherein the radio frequency identification tag is a passive tag and the system further comprises:
the radio frequency identification emitter to activate the radio frequency identification tag, the activating causing the radio frequency identification tag to transmit the signal to the image recorder.

11. The system of claim 9, wherein the data about the object further comprises a size of the object.

12. The system of claim 11, wherein the marking further includes overlaying an image of the object on the image at the location, wherein the overlaying at the location of the radio frequency identification tag is responsive to the data about the object.

13. The system of claim 9, further comprising:
a positioning mechanism for determining prior to the recording if a field of view of the image recorder includes the location of the radio frequency identification tag; and
positioning the image recorder so that the field of view of the image recorder includes the location of the radio frequency identification tag in response to determining that the field of view of the image recorder does not include the location of the radio frequency identification tag.

14. The system of claim 9, wherein the radio frequency identification tag is attached to the object, for causing the image recorder to focus on the object.

15. The system of claim 9, further comprising:
the image recorder for receiving an additional signal from an additional radio frequency identification tag, the radio frequency identification tag and the additional radio frequency identification tag making up a constellation; and
the image recorder for determining a location of the additional radio frequency identification tag, wherein the image that is recorded further includes the location of the additional radio frequency identification tag.

16. The system of claim 15, further comprising:
the image recorder for determining prior to the recording if a field of view of the image recorder includes the location of the radio frequency identification tag and the additional radio frequency identification tag, and for positioning the image recorder so that the field of view of the image recorder includes the location of the radio frequency identification tag and the additional radio frequency identification tag in response to determining that the field of view of the image recorder does not include the location of the radio frequency identification tag and the additional radio frequency identification tag.

17. The system of claim 9, wherein the image recorder is a video camera.

18. A non-transitory computer-readable medium storing a plurality of instructions which, when executed by a processor of an image recorder, cause the processor to perform operations for providing a marked image, the operations comprising:
recording an image that includes a location of a radio frequency identification tag; and
marking the location of the radio frequency identification tag on the image, resulting in the marked image, wherein the marking is performed by overlaying the location of the radio frequency identification tag identified on the image, wherein the image is recorded by the image recorder that recognizes a first signal emitted from the radio frequency identification tag, wherein the first signal comprises an ultraviolet signal and the marking is performed by the image recorder based on the first signal, wherein the radio frequency identification tag is attached to an object and the first signal includes data about the object, the data comprising a value of the object, wherein the first signal is emitted by the radio frequency identification tag when the radio frequency identification tag receives a radio frequency signal from a radio frequency identification emitter.

19. The non-transitory computer-readable medium of claim 18, wherein the data about the object further comprises a size of the object.

20. The non-transitory computer-readable medium of claim 19, wherein the marking further includes overlaying an image of the object on the image at the location, wherein the overlaying at the location of the radio frequency identification tag is responsive to the data about the object.

* * * * *